Aug. 18, 1953 K. L. BICE 2,649,000
LAYOUT DEVICE FOR MACHINE TOOLS
Filed Aug. 29, 1949 4 Sheets-Sheet 1

INVENTOR.
KENNETH L. BICE
BY
Charles R Fay
atty.

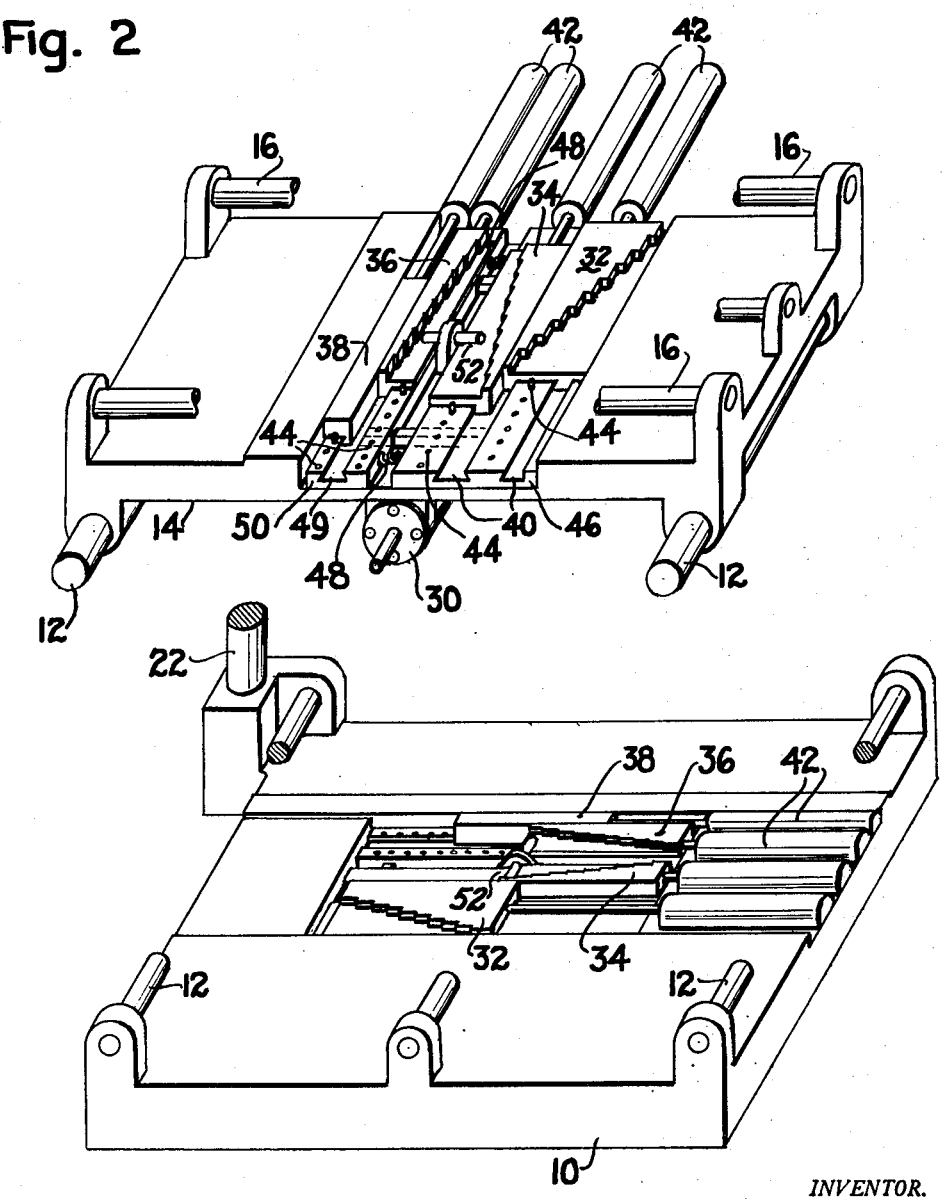

Aug. 18, 1953  K. L. BICE  2,649,000

LAYOUT DEVICE FOR MACHINE TOOLS

Filed Aug. 29, 1949  4 Sheets-Sheet 3

INVENTOR.
KENNETH L. BICE
BY Charles R. Fay
Atty.

INVENTOR.
KENNETH L. BICE

Patented Aug. 18, 1953

2,649,000

UNITED STATES PATENT OFFICE 2,649,000

LAYOUT DEVICE FOR MACHINE TOOLS

Kenneth L. Bice, Framingham, Mass.

Application August 29, 1949, Serial No. 112,962

5 Claims. (Cl. 77—64)

This invention relates to layout devices for machine tools particularly adapted to and herein illustrated as incorporated in a drilling machine, the principal object of the invention residing in the substantially automatic positioning of the work piece for the drilling of holes therein at exactly specified points by means which depend on accurate automatic gauging means and not upon the skill of the operator.

In laying out a piece of work to be drilled, the work piece is usually moved under control of the operator to locations where the drilling is to be done and this commonly involves manual positioning of the work piece as, for instance, by means of a table which may be universally moved in a horizontal plane by means of screws or racks located at right angles to each other and moving the table anywhere the operator desires it, so that a hole may be made as accurately as may be where it is desired in the work piece, this operation being repeated according to a blueprint.

This, of course, requires a skilled machinist, good eyesight, etc.; but by means of the present invention, all manual operations such as here described are completely done away with, the operator merely pressing keyboard buttons which automatically preset the device to be moved to 1/1000 of an inch in both of two right angular directions and including mechanical means for then moving the work table according to the preset gauges.

Another object of the invention resides in the provision of automatically operated gauging means which are preset on a keyboard merely by pressing certain keys after which, when desired, the operator presses another button or closes a switch whereupon the work table will automatically move exactly to the desired location within an accuracy of 1/1000 of an inch and while the drilling is in progress at this point, the device may be preset on the keyboard so that as soon as the drill retracts, all the operator has to do is to again close the switch or press the button which initiates the moving of the work table to the second preset location, etc.

Other objects and advantages of the invention will appear hereinafter.

Reference is to be had to the accompanying drawings in which

Fig. 2 is a perspective view of the intermediate table;

Fig. 3 is a perspective view of the lower table;

Figure 1:
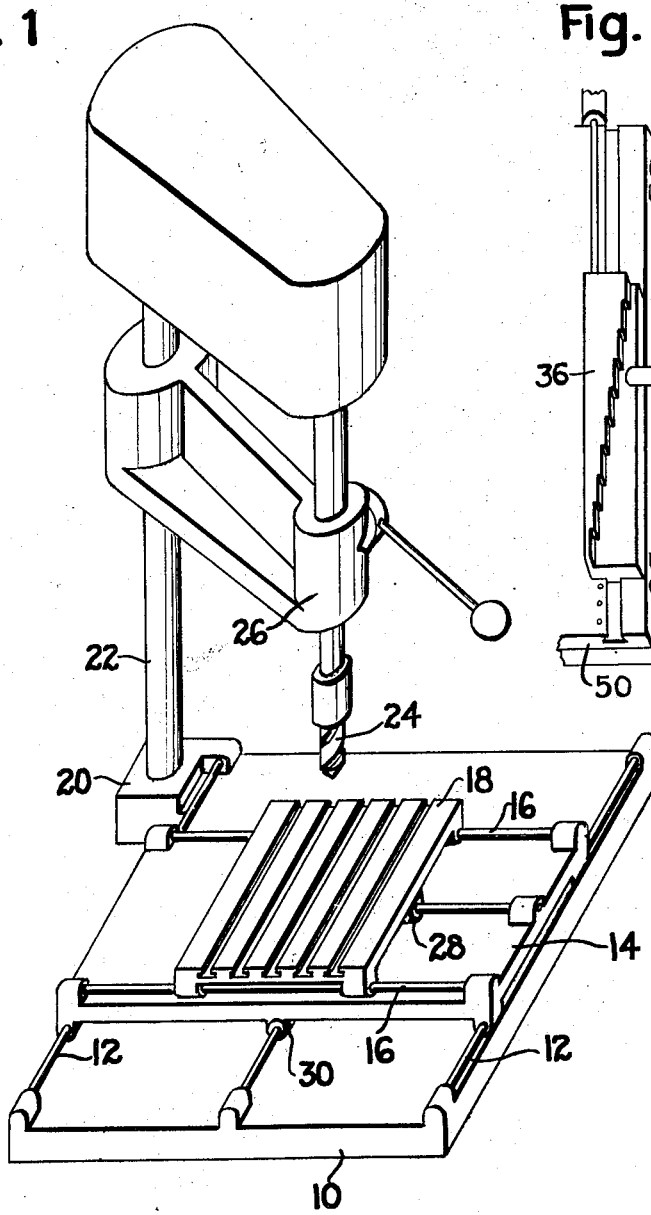
Fig. 1 is a perspective view showing the table assembly as it appears in relation to the drill press or other tool.
Figure 9:
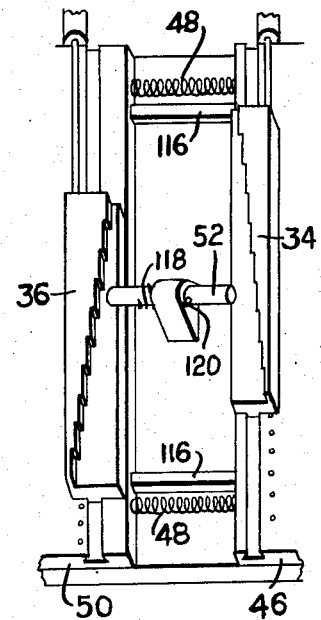
Fig. 9 is a further detailed showing of the cumulative stop features of the device.

Referring now to Fig. 1, there is shown a stationary fixed base 10 having ways 12 thereon for rectilinearly guiding a movable table 14. Table 14 in turn is provided with ways 16 which are located at right angles to ways 12 and support a work table 18 which is universally movable in a horizontal plane as will be clear to those skilled in the art.

The base 10 is located by a boss 20 with relation to standard 22 of a machine tool having a cutter 24 rotatably mounted in a head 26. In this particular case, the cutter 24 is a drill and the entire invention is shown as applied to a drill press but it is to be understood that this invention could be adapted to any other machine tool. Table 18 is traveled along ways 16 by means of a hydraulic cylinder 28 and table 14 is traveled along ways 12 by means of a hydraulic cylinder 30 under controls to exactly position table 18 where desired as will be hereinafter more fully described.

Referring now to Fig. 2, the intermediate table 14 is shown in detail. Generally centrally thereof and arranged to slide parallel to ways 12 there are a plurality of gauge blocks which are identified by numeral 32 which is the "inch block"; 34, the .1 inch block; 36, the .01 inch block and 38, the .001 inch block. These blocks are arranged to slide in appropriate guideways as for instance at 40 by hydraulic cylinders 42 and each block is separately powered so that any arrangement of blocks is possible according to the actuation of stop pins 44. In other words, a stop pin 44 for any block may be moved upwardly out of the base 14 to lie in the path of the respective blocks 32, 34, 36, 38 and then the appropriate cylinder 42 being energized such blocks will move forwardly and be stopped by the pins 34 where desired, according to which pin 44 is raised. The blocks are stepped as by inches, tenths, hundredths and thousandths, block 38 as a practical matter being tapered.

Blocks 32 and 34 slide in ways 40 in a block 46 which is laterally movable against the action of springs 48, block 36 and 38 being slidable in ways 49 in block 50. A pressure pin 52 is arranged to contact blocks 34 and 36 and the purpose of this is that in order to attain the measurement of gauge blocks 32, 34, 36 and 38, it is necessary to bring them into additive engagement. Thus the plate 46 is movable laterally, once the correct location of the gauge blocks is determined, so as to add up the total measurement of all of the four parts.

Block 34 is carried toward pressure pin 52 by the lateral motion of block 46 on trunnions 116 against the pressure pin 52 by the lateral motion of block 50. Block 50 is actuated by the motion of the tapered block 38. Block 34 is actuated by the motion of table 18, see Fig. 1. Block 46 does not start its motion (laterally on trunnions 116) until after block 50 has stopped moving. The motion of block 46 toward pin 52 does not stop until block 34 has contacted pin 52 and further until pin 52 has contacted block 36. At this time, therefore, all blocks 32, 34, 36 and 38 have been brought into positive additive engagement.

When blocks 34 and 36 are not in additive engagement, as for example when these blocks are in transverse motion under action of cylinders 42, the blocks are held away from pin 52 by springs 48. Pin 52 is held in a neutral position by the action of compression spring 118 and pin 120.

The base 10 is provided with a similar mechanism but located at a right angle thereto and this mechanism will therefore not be fully described as it is a duplication of the parts controlling table 14 whereas the above described gauging mechanism on table 14 controls the position of table 18.

Figure 4:
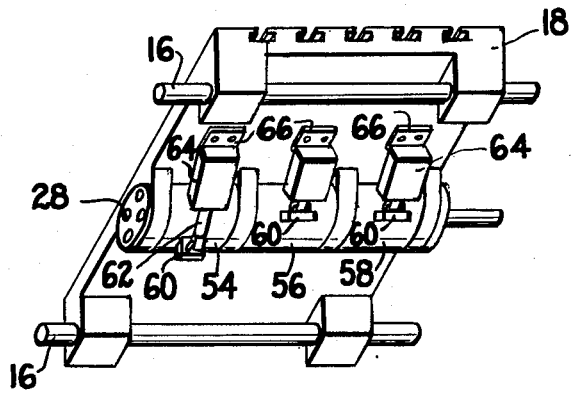
Fig. 4 is a perspective view of the underside of the top table.

Referring now to Fig. 4, table 18 is provided with special mechanism on the hydraulic cylinder 28, said mechanism comprising three rotatable sleeves 54, 56 and 58 each of which is provided with a laterally extending stop block 60, each stop block having pivotally connected thereto a piston rod 62 operatively associated with a cylinder 64 on a hinge 66 to the underside of the table 18. The purpose of this construction is to selectively position any one of stops 60 in a downwardmost operative position, where it may engage the gauge block 32 and move the same laterally as above described to add up the total gauge block device so as to act as a stop locating the position of table 18 longitudinally along ways 16. In other words, the four gauge blocks having been moved to the desired positions, the appropriate stop block 60 is moved down under influence of its cylinder to a position where it will engage the gauge blocks and be stopped thereby. The stop block 60 in Fig. 4 to the left which is illustrated in the down or operative position is the first 10-inch stop block; the central stop block 60 which is in inoperative position is the 20-inch stop block, and the stop block 60 to the right which is also inoperative is the 30-inch stop block because obviously stop block 60 in operative position will strike the gauge block 32 very quickly after initial starting whereas the other two stop blocks 60 will engage gauge block 32 at later intervals which are preferably in the nature of steps of 10 inches each.

Figure 5:
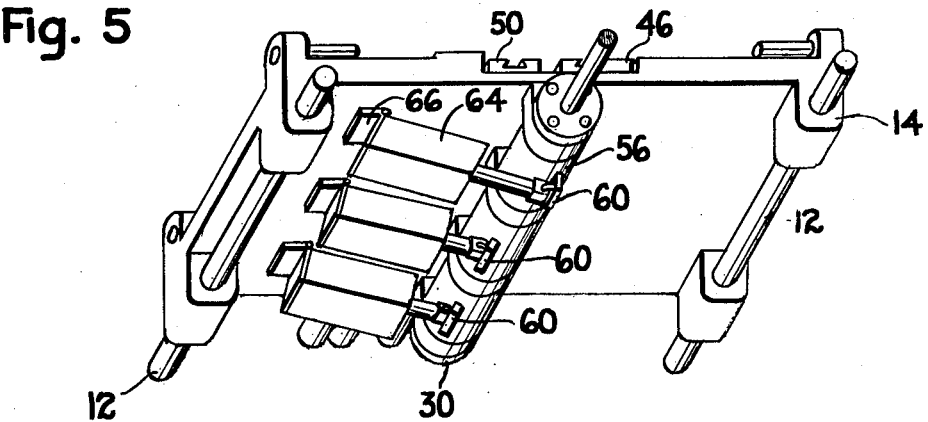
Fig. 5 is a perspective view of the underside of the intermediate table.
Figure 6:
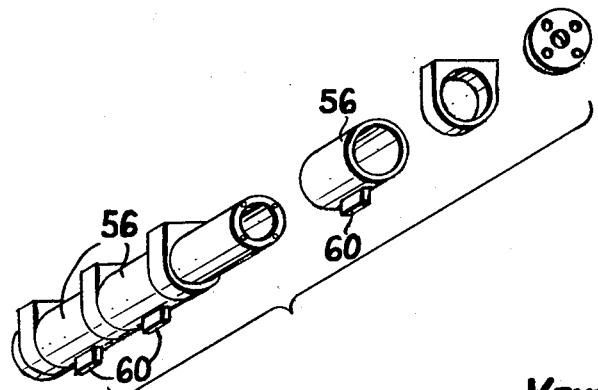
Fig. 6 is an exploded view of a hydraulic cylinder and stop sleeves therefor.

As shown in Fig. 5, table 14 is provided with the same arrangement as to its cylinder 30 for the same purpose, the three stops 60 in Fig. 5 being controlled by cylinders 64 as above described with relation to Fig. 4 to position table 14 at 10-inch intervals in addition to the gauging action of the gauge block.

It will be seen from the above that upon proper selection, of the cylinders 64 and 42, the gauge blocks and tables may be preset to the desired positions anywhere on the table within range of the tool and then it is merely necessary to energize cylinders 28 and 30 to bring the table 18 to the desired location.

Figure 8:
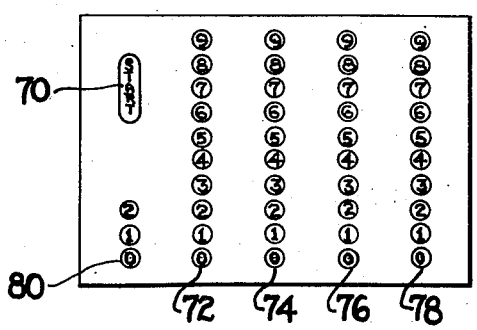
Fig. 8 is a view showing how one of these switchboard control panels appears.

Any desired means may be used to operate the stop pins 44, and in the present case, this takes the form of solenoids, one for each of the stops 44, each solenoid being electrically energized from a keyboard such as is shown in Fig. 8. Hence, the operator merely has to press the right buttons in order to energize the appropriate solenoids to preset the exact work location, and since the buttons merely cause the pins 44 to rise, the entire setting may be done while the previous setting is utilized by being worked on by the tool. As soon as the tool retracts, the start button 70 is merely pushed to restart the table travel to a new location. The buttons may be arranged in four rows, as shown in Fig. 8, for inches, tenths, hundredths, and thousandths, as at 72, 74, 76 and 78, there being a keyboard for each moving table. The three stops 60 are controlled by the three buttons 80.

Figure 7:
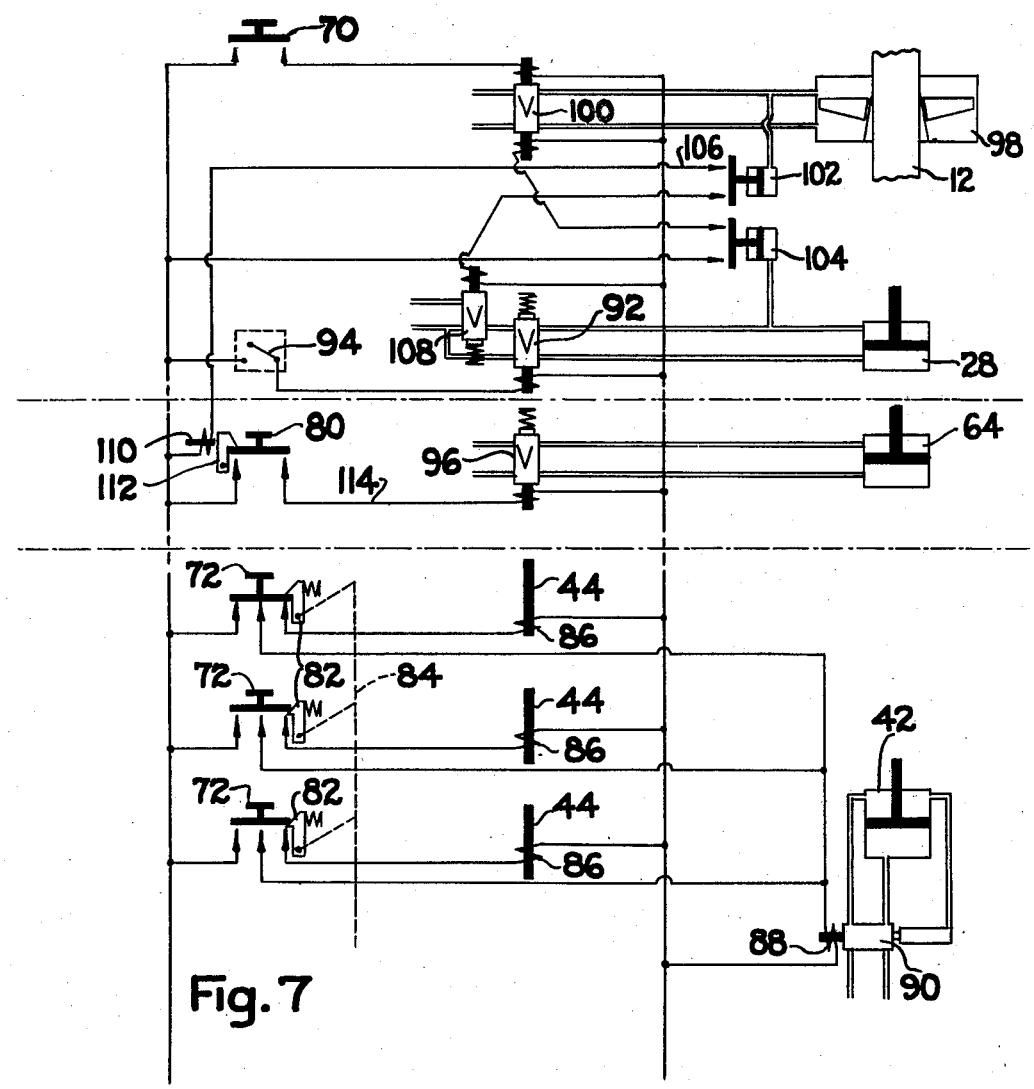
Fig. 7 is a circuit diagram of the switchboard controls.

Referring now to Fig. 7, buttons 72, 74, 76, etc., when pressed down, are held by spring catches 82 until any other button in the same column is pressed down where connection 84 releases the held button. When contact is made, the solenoid 86 raises its pin 44 and a one shot solenoid 88 operates a reversible valve 90 to cause cylinders 42 to retract the blocks 32, 34, 36, 38. When the cylinders are fully retracted the valve 90 is mechanically reversed as by a spring to cause the cylinders to advance until the blocks are stopped by the pins 44. These circuits are the same for all forty push buttons.

Valve 92 controls the direction of travel of the tables. If a table is farther forward on the last cycle than is desired for a subsequent cycle, switch 94 closes. These switches are located on stops 60 and will be closed due to interference between the stops and block 32, and this causes valve 92 to retract the table cylinder 28 or 30 as the case may be. The circuit will, of course, break upon disengagement of block 32 and stops 60 and valve 92 mechanically reverses to reverse direction of travel of the respective table to cause the latter to move forward and engage the blocks. Cylinders 64 are controlled by the forward and reverse valve 96 which is similar to valves 92 and 90, and 98 indicates collet chucks to clamp the tables to ways 12 and 16 upon appropriate operation of valve 100. Elements 102 and 104 are pressure switches.

Assuming a table is locked by the collet chucks, and all blocks and stops in place, the starting button 70 operates valve 100 to release the pressure in the chucks 98. This pressure closes circuit 106 opening valve 108. The table moves to the next position with valve 108 open. Then when the table cylinder reaches the end of its stroke, pressure builds up and closes switch 104 operating valve 100 to lock the collet chucks. Pressure builds up in the latter closing switch 102 operating valve 108 to release pressure in the table cylinder, and this also trips solenoid 110 to release button 80 held down by catch 112.

When this happens, circuit 114 is broken and cylinder 64 retracts its stop.

Solenoid 110 is a momentary or trip (one shot) action device when energized to hold keys 80 depressed. When pressure switch 102 is released and opens circuit 106, solenoid 110 is de-energized but does not affect latch 112 because of the "one shot" or trip mechanism. However, valve 108 is operated by the spring as the solenoid de-energized.

As the table cylinder 28 pressure builds up, pressure switch 104 contacts and reverses valve 100 which clamps the collets.

The pressure switch 102 should not contact until the collets are clamped therefore, the switch is connected to the clamping pressure line of the collets 98. This will allow the table cylinders to start before the collets are completely unclamped.

When the pressure switch 102 closes it energizes the solenoid 110 which trips the key latch and then becomes inoperative due to momentary or "one shot" mechanism. At the same time, the valve 108 is reversed and cuts off the table cylinder pressure.

Having thus described my invention and the advantages thereof, I do not wish to be limited to the details herein disclosed, otherwise than as set forth in the claims, but what I claim is:

1. The combination of a machine tool with a base, ways thereon, a table on the ways, ways on the table, and a second table on the second-named ways, movable gauges on the first table to position the second table and movable gauges on the base to position the first table, means on each table to engage the respective gauges, clamping means for each table, power-operated means under control of an operator to position the gauges, a keyboard for each table, a switch on each keyboard for each step in each gauge, a stop for for each step of each gauge, and means to move the stops into and out of the paths of the gauges, said last-named means being controlled by the switches.

2. In a device of the class described, a base and a pair of superposed tables adapted to be traveled at angles to each other, means to travel the tables, a set of movable stepped gauges on the base and a set of movable stepped gauges on the lower table, said sets of gauges being movable transervsely of the direction of movement of the table just above the same, means to move each gauge individually, means to stop such movement of each gauge individually, depending retractible means on each table engaging the respective sets of gauges additively, means under control of the operator to actuate the stop means, and move the gauges and tables, the gauge stopping means comprising retractible elements selectively operated at the will of the operator to extend into or to be retracted from the paths of the individual gauges.

3. The device of claim 2 wherein the depending retractible means for each table comprises a plurality of stops spaced along the respective tables in the direction of movement thereof, so that the table may move in increments in addition to the gauges, depending on which depending retractible stops is in operative non-retracted position.

4. The device of claim 2 wherein the depending retractible means for each table comprises a plurality of stops spaced along the respective table in the direction of movement thereof, so that the table may move in increments in addition to the gauges, depending on which depending retractible stops is in operative non-retracted position, power means to extend or retract each retractible stop and switch means to control said power means, there being a switch for each such stop.

5. In a device of the class described, a base, ways thereon, a lower table on the ways, ways on the lower table at angles to the first-named ways, an upper table on the lower table ways, a set of parallelly movable stepped gauge blocks on the base, means to move each block separately, a line of movable stops for each block to limit the travel thereof at predetermined locations, means to move each stop separately into or out of the paths of the blocks, a plurality of spaced retractible stop elements on the lower table, means to separately move the same into inter-engaging condition relative to the gauge blocks, the latter moving transversely to the table movement and the stop elements being located in line parallel to the table movement, means to locate the lower table in desired position relative to the lower table, a keyboard, switches thereon controlling the gauge block moving means, the gauge block stop moving means, and the advance and retraction of the retractible stop element.

KENNETH L. BICE.

References Cited in the file of this patent

UNITED STATES PATENTS

| Number | Name | Date |
|---|---|---|
| 613,073 | Partington | Oct. 25, 1898 |
| 1,028,660 | Barber | June 4, 1912 |
| 2,007,180 | Doran et al. | July 9, 1935 |
| 2,020,868 | Barnes et al. | Nov. 12, 1935 |
| 2,114,284 | Barnes et al. | Apr. 19, 1938 |
| 2,236,881 | Rusnak | Apr. 1, 1941 |
| 2,440,916 | Rusnak | May 4, 1948 |
| 2,473,506 | Bullard III | June 21, 1949 |
| 2,473,507 | Bullard III | June 21, 1949 |